United States Patent

Swanson

[15] 3,638,408
[45] Feb. 1, 1972

[54] REEL ASSEMBLY FOR HARVESTER

[72] Inventor: Garland L. Swanson, P.O. Box 324, Ione, Oreg. 97843

[22] Filed: Feb. 24, 1970

[21] Appl. No.: 13,439

[52] U.S. Cl. .................................................56/219
[51] Int. Cl. .....................................................A01d 57/00
[58] Field of Search ..............................56/226, 227, 219

[56] References Cited

UNITED STATES PATENTS

| | | | |
|---|---|---|---|
| 3,217,473 | 11/1965 | Lawrie | 56/219 X |
| 2,454,063 | 11/1948 | Irvine | 56/219 |
| 991,213 | 5/1911 | Van Kooy | 56/219 |
| 2,823,511 | 2/1958 | Beaty | 56/219 X |
| 2,008,470 | 7/1935 | Rall et al. | 56/219 |

*Primary Examiner*—Louis G. Mancene
*Assistant Examiner*—D. L. Weinhold
*Attorney*—Christensen & Sanborn

[57] ABSTRACT

A noncircular reel apparatus for use with agricultural harvesting equipment is described. The reel assembly is positioned above the cutter bar of a harvesting machine header. A plurality of slats traverse a substantially triangular path to sweep the agricultural product onto the header. The slats are maintained at a predetermined pitch through the use of a crank and eccentric apparatus, the crank travelling in a path substantially congruent to that of the noncircular path of the slats. The reel apparatus is supported at each end by a pair of support arms, each of which is pivotally attached to the header at one end and to the reel mechanism at the other end, permitting the raising and lowering of the reel assembly without changing angular orientation of the reel with respect to the header. The path of the slats causes them to enter the grain or other agricultural plant being harvested and sweep them across the cutter assembly without undue shattering and loss of the product. Short stalked plants are prevented from falling forward out the harvesting assembly after being cut.

10 Claims, 4 Drawing Figures

PATENTED FEB 1 1972
3,638,408
SHEET 1 OF 2
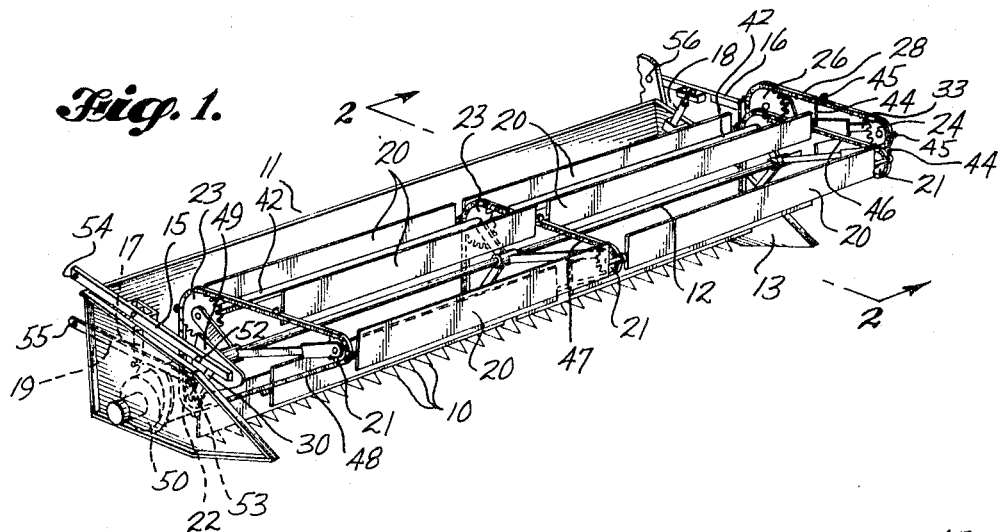
INVENTOR.
GARLAND L. SWANSON
BY
Christensen Sanborn & Matthews
ATTORNEYS

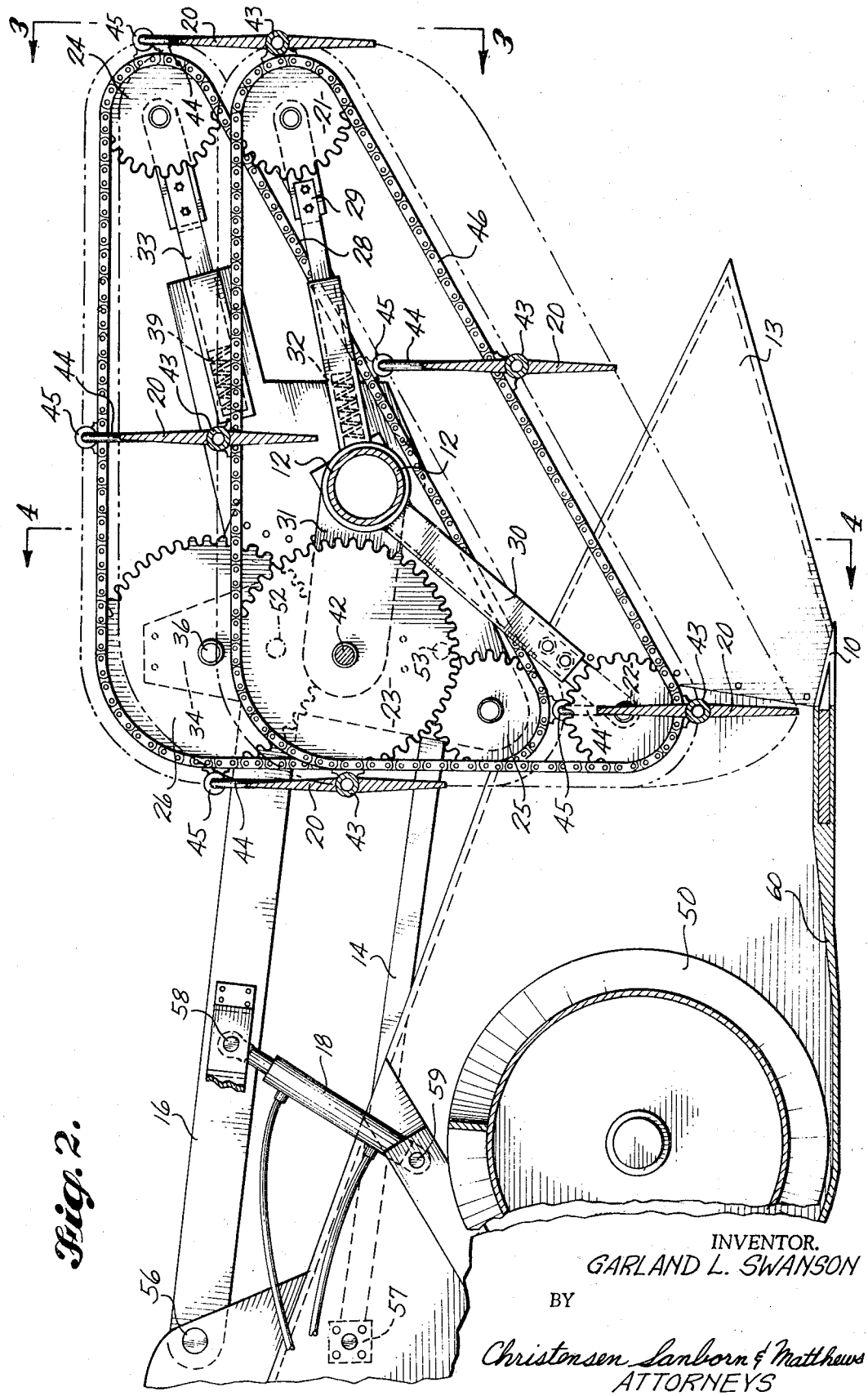

3,638,408

REEL ASSEMBLY FOR HARVESTER

BACKGROUND OF THE INVENTION

This invention relates to improvements in agricultural machinery and more particularly to improvements in reel mechanisms connected to the header portion of a harvesting machine.

The grain headers of the prior art for the most part have utilized a circular reel to attempt to sweep grains or other agricultural products across the cutter bar carried by the combine header. The crossmembers of a circular reel move up and down through the grain as the reel rotates, frequently hitting and rupturing the ripe ears of grain prior to the time the grain stalks are engaged by the cutter bar. The grain ears thus shattered lose a significant portion of the grain to the ground. The circular reels of the prior art are mounted in front of the cutter bar so that they may engage the grain before the cutter bar reaches the grain stalks. Consequently the crossmembers on the circular reel are moving upwardly at the time the grain stalks are severed by the cutter bar. Whenever the grain is present on short stalks, the reel cannot be set low enough to sweep the cutter bar and force the short grain stalks into engagement with the auger placed behind the cutter bar. This results in a great deal of short-stalked grain sliding down the forward section of the header and through the cutter bar to the ground.

The circular reels of the prior art also produce a varying slat speed relative to the ground, due to the circular path traversed by the slats in this type of reel design. The greatest speed of the slats relative to the ground is attained at their lowermost position, while at the front and rear positions the horizontal speed approaches zero. This feature is particularly troublesome when harvesting short-stalked grain since the rearward portion of the travel of the circular reel is the point at which the greatest speed and force need to be imparted to the grain to cause it to enter the auger mechanism rather than falling forward onto the ground. The circular design does not allow the slats to adequately sweep the cutter bar whenever the header is set in a low-cutting position. The reel must occupy a position sufficiently above the cutter bar to prevent its striking the ground in front of the cutter bar and also to provide adequate clearance between the auger and the reel mechanism. Thus a large gap usually is present between the circular reel and the cutter bar, permitting a great deal of the grain to be lost.

Another prior art mechanism provides a noncircular reel mechanism for use on a swather apparatus. The crossmembers of this device are fixed on a flexible endless belt and are thus caused to rotate sharply about an axis at the instant these crossmembers engage the grain or other agricultural product. The mechanism is adequate for its intended purpose of forcing agricultural products such as unripe grain or hay into a swather. However, in fully ripe grain the application of this type of reel assembly to a combine header would result in significant losses of the product due to fracturing of the fragile ears of grain by the impact of the crossmembers.

Another prior art mechanism provides a chain- and slat-type reel for combines which traverses a noncircular path, using simple square or round slats which engage only a portion of the grain being harvested. No provision is made for orienting the slats during travel about the chain path, and the narrow slats do not engage the grain properly to permit efficient harvesting of various heights of grain. No provision is made for vertical or horizontal adjustment to meet varying conditions in the field.

OBJECTS OF THE INVENTION

It is therefore a prime object of this invention to provide a noncircular reel assembly for use on a combine or similar agricultural harvesting apparatus.

Another object of this invention is to provide a reel apparatus for use with the header of a combine wherein the reel cross slats maintain a constant pitch to cause the agricultural product being cut, including short-stalked grain, to be swept into the combine header without significant loss of the product.

Yet another object of this invention is to provide a reel assembly which maintains its angular orientation with respect to the header regardless of the height above the ground to which the reel and header are adjusted.

A further object of this invention is to provide a reel assembly for agricultural harvesting equipment in which the reel slats move at a constant speed relative to the ground speed during the time that the slats engage the agricultural product and sweep it onto the header and auger mechanism of the harvesting device. A related object is to provide a reel design which permits the slats to sweep the cutter bar with the header in any cutting position while maintaining adequate ground and auger clearance.

SUMMARY OF THE INVENTION

These and other objects of the invention may be accomplished by providing a reel assembly in conjunction with the header for a grain combine or similar harvesting machinery which has a plurality of horizontal slats carried by a pair of endless flexible members which travel about a noncircular path above the cutter bar on the header. The slats are held at a constant pitch by use of a crank arm and eccentric assembly attached to the slat. The crank arm travels in a path substantially congruent to the path of travel of the endless flexible member which carries the slats such that the slats maintain the desired pitch whenever they are in a position to engage the agricultural product being harvested. The reel assembly is attached at each end to the header assembly by a pivotal mounting means which operates to maintain the reel assembly in a constant angular orientation with the header assembly regardless of the height to which the reel has been set. The height of the reel is adjustable by forces imparted to the mounting assembly by any one of a number of mechanical means well known in the art. A main support member extends from one side of the reel assembly to the other. A plurality of supporting arms are attached to the main support member and engage the flexible members to which the slats are attached. The lower portion of travel of the endless flexible member carrying the slats is maintained at an acute angle to the ground such that the slats gently enter the agricultural product in preparation to sweeping the agricultural product onto the table of the harvesting apparatus as the harvesting apparatus moves through the field. This feature is particularly important in harvesting grain in that a minimum of shattering of the grain ears occurs due to this configuration. Furthermore, the rearwardmost portion of the travel of the slats may be located to the rear of the cutter assembly so that the agricultural product is conveyed in a positive fashion over the cutter assembly and into the harvesting apparatus. An additional feature of this invention resides in the shape and structure of the slats and their accompanying orienting mechanism in that the wide slats held at a constant pitch more adequately engage the agricultural products than would narrow slats. This feature provides a greater degree of versatility to the harvesting operation. Holding the slats a constant pitch allows them to enter the agricultural product prior to cutting without a severe amount of shattering of the dry product, yet permitting positive engagement of the agricultural product with the wide slats to aid in conveying it onto the header table.

DESCRIPTION OF THE PREFERRED EMBODIMENT

A preferred embodiment of this invention is described in detail below with reference to the attached drawings wherein:

FIG. 1 shows a front perspective view of a combine header having the device of this invention installed thereon;

FIG. 2 shows a cross-sectional view of the header reel apparatus taken along lines 2—2 of FIG. 1;

FIG. 3 shows a partial cross-sectional view of the crank arrangement for orienting the slats taken along lines 3—3 of FIG. 2, with the portion of the apparatus back of line 3—3 omitted for clarity;

FIG. 4 shows a cross-sectional view of the driving mechanism of the reel apparatus taken along lines 4—4 of FIG. 2 with the portion of the apparatus behind line 4—4 omitted for clarity.

Referring more particularly to the drawings, wherein like numerals indicate like parts, there is seen in FIG. 1 a combine header assembly having a noncircular reel apparatus disposed above the cutter bar 10 of the header 11. In this particular embodiment, the slats 20 move in a triangular path to come in contact with the agricultural product being harvested. An auger 50 is rotatively mounted in the header 11 to move the grain from each side of the header after being cut into a central portion where it is injected into the threshing mechanism of the combine. The auger 50 is disposed to the rear of a cutter bar 10 of the sickle bar type.

Referring to FIGS. 1 and 2, there is shown a frame apparatus comprising, on the left side, a left reel support arm 16 and a left positioning arm 14 which are pivotally connected at one end to the header at pivots 56 and 57 respectively, and which adjustably engage the crank chain sprocket mounting plate 34 at the other end at pivots 52 and 53 respectively. Left reel support arm 16 is movable by hydraulic cylinder 18 so that the height of the reel assembly above the cutter bar can be varied as desired. The angular relationship between the header and the reel assembly is maintained by the box or parallelogram structure formed by the left positioning arm 14, the left reel support arm 16, the frame of header 11 and the crank chain sprocket mounting plate 34. This structure permits raising and lowering of the reel assembly without changing its angular orientation with respect to the header. The hydraulic cylinder 18 is pivotally connected to left reel support arm 16 and header 11 at pivots 58 and 59 respectively. The truss structure so formed permits raising and lowering of the header by extending or retracting the hydraulic cylinder 18.

At the other end of the header 11, a right reel support arm 15 and a right reel positioning arm 19 are pivotally attached to header 11 at pivots 54 and 55 respectively and pivotally engage the right reel support plate 49 at pivots 52 and 53 respectively. The hydraulic cylinder 17 is pivotally connected to header 11 at one end and to right reel support arm 15 at the other end to raise and lower the right side of the header by extending or retracting the hydraulic cylinder 17.

The crank chain sprocket mounting plate 34 and the right reel support plate 49 each engage one end of the main support shaft 12 which extends from one side to the other of the reel assembly. The shaft 12 provides the support and rigidity necessary for operation of the reel apparatus.

Referring particularly to FIG. 1, an overall perspective view of the reel assembly of this invention is shown having a plurality of slats 20 carried by endless chain members 46, 47, and 48. Each of these chain members travels in a triangular path formed by sprockets 21, 22 and 23. Each sprocket is located substantially upon a vertex of a right triangle which has the right angle at the upper rear of the reel. The reel mechanism is oriented such that the hypotenuse of the triangular path lies at an acute angle to the ground, the lower vertex of the triangular path being positioned above and slightly to the rear of the cutting bar 10 carried by the header 11.

The individual slats 20 are oriented in a substantially vertical position throughout their travel about the triangular path set up by the endless chain members 46, 47 and 48 by use of a crank arm and eccentric assembly. The eccentric assembly is situated slightly above and to the side of the endless chain member 46 and has a shape substantially congruent thereto. In FIGS. 2, 3 and 4, the crank arm and crank chain assembly is shown in detail. Crank arms 44 are rigidly attached to slats 20 and pass through bearing members 43 attached to the endless chain 46. The other end of crank 44 is attached to bearing members 45 which are in turn carried by crank chain 28. Crank chain 28 passes about front crank chain sprocket 24, bottom crank chain sprocket 25 and top crank chain sprocket 26 in a path having its elements substantially parallel to corresponding elements of the path of endless chain 46. This apparatus provides a means to maintain the slats at a predetermined pitch while traversing a substantially triangular path.

The reel apparatus receives its main support and rigidity from the main support arm 12 which extends completely across the reel apparatus and is rigidly attached to the crank chain sprocket mounting plate 34 on the left-hand side of the reel and to the right reel support plate 49 on the right-hand side of the reel. The right reel support plate 49 and the crank chain sprocket mounting plate 34 are in turn pivotally engaged by the right reel support arm 15 and the left reel support arm 16 respectively and by the right positioning arm 19 and the left positioning arm 14 respectively as described above.

With particular reference to FIGS. 2, 3 and 4, there is shown front slat chain sprocket arm 29, bottom slat chain sprocket arm 30 and top slat chain sprocket arm 31 attached to the shaft 12 at each end thereof and at one or more positions intermediate the ends of shaft 12. The sprocket arms in turn carry the individual chain sprockets 21, 22 and 23 which engage the endless chain members 46, 47 and 48. The front slat chain sprocket arm 29 is extendable outwardly under the influence of the spring and slide member 32 which imparts tension upon the endless chain member 46, causing it to maintain its triangular path.

The crank chain sprocket mounting plate 34, which is firmly attached to the main support shaft 12, is located adjacent the path of the endless chain member 46 and carries a bottom crank chain sprocket 25 and a top crank chain sprocket 26 mounted for rotation thereon. The front crank chain sprocket 24 is mounted on sprocket arm 33 which comprises an extensible member constrained outwardly by spring and slide 39. The crank chain 28 engages and passes around the crank chain sprockets 24, 25 and 26 in a triangular path substantially congruent to that path set up by slat chain sprockets 21, 22 and 23. The crank chain 28 carries bearing members 45 which engage the crank 44 to maintain the slat in its desired pitch during the motion of the slat about its triangular path defined by endless chain elements 46, 47 and 48.

Referring particularly to FIG. 4, which shows a partial cross-sectional view of the driving mechanism of the reel assembly, the structural relationship between the various parts can be ascertained. This view is taken along lines 4—4 of FIG. 2 with many of the elements back of line 4—4 omitted for clarity. This view shows that the crank chain sprocket mounting plate 34 provides the basic structural support for the rest of the apparatus. The U-shaped plate 61, which is attached to plate 34, carries a pair of bearings 38 and 37. The top slat chain drive axle 35 is journaled for rotation into bearing 38 and carries the V-belt drive assembly 41 which provides power to the reel apparatus. A connecting sprocket and chain assembly 40 transmits power to the top crank chain drive axle 36 which is journaled into bearing 37 for rotation. At the other end of the top crank chain drive axle 36 the top crank chain sprocket 26 is mounted to transmit rotative motion to crank chain 28.

By this assembly, crank chain 28 and endless chain member 46 are caused to travel at the same linear speed so that the relationship between the slats 20 and the crank chain 28 can be maintained. The drive shaft 42, which is an extension of the top slat chain drive axle 35, provides power to operate the endless chain members 47 and 48 and extends across the length of the reel assembly parallel to main support shaft 12. Thus, endless chain members 46, 47 and 48 and crank chain 28 all move at the same rate of speed to keep slats 20 moving in the proper orientation and pitch about their triangular path.

In operation, the reel apparatus described above is located in the proper position relative to the header for varying conditions including plant stalk height, type of plant being harvested and other factors, by extending or retracting the hydraulic cylinders 17 and 18. Power is then applied to the reel mechanism through the V-belt drive assembly 41. This power may be provided by the engine which supplies power to the harvesting mechanism or by the axle carrying the harvesting machine so that the speed of the reel assembly will vary with the ground speed. In either event the harvesting mechanism is powered up to its operating speed and the harvester is moved forward into the crop being cut. The slats 20 on the reel mechanism then move along the triangular path as discussed above, sweeping the agricultural product into contact with the cutter bar. The agricultural product is then forced onto table 60 of the header 11 and into contact with auger 50. Auger 50 moves the agricultural product into the central portion of the harvesting apparatus for treatment therein.

The reel assembly may be moved forward or backward by changing the location of pivot points 52 and 53 on each side of the reel assembly. Thus for certain conditions it may be desirable to have the reel assembly located immediately adjacent auger 50 to insure that short-stalked grain may be deposited upon the table 60 back of cutter bar 10. For cutting grain of normal length and for other usual conditions, the locations shown in the attached drawings would be preferable, permitting deposit of the grain or other agricultural product on the table 60 after being cut, but without forcing it firmly into contact with auger 50.

The angular orientation of the reel assembly may also be varied by changing the location of either pivot point 52 or pivot point 53, thus causing the leading portion of the reel to be raised or lowered without markedly changing the location of the lower rear portion of the reel assembly.

The foregoing description of the construction and operation of the preferred embodiment of this invention is considered to be illustrative only of the principles of the invention. Many changes, alterations and modifications will readily occur to those skilled in the art and it is therefore not the intent of the inventor that the invention be limited to the preferred embodiment shown and described, but rather that the invention encompass all suitable modifications and equivalents well known to those skilled in the art.

I claim as my invention:

1. A reel assembly for harvesting equipment having a header mechanism including a cutter bar means attached thereto, said reel assembly comprising:
   frame means engaging said header;
   a plurality of flexible endless members mounted on said frame means and positioned above said cutter bar means for motion about a noncircular path substantially perpendicular to said cutter bar means;
   rotative drive means engaging each of said endless members;
   a plurality of horizontally disposed slat members carried by said endless members and mounted thereon to permit rotation of said slat members about individual horizontal axes, said slat members each having axially positioned crank elements fixed thereon; and,
   guide means positioned adjacent at least one of said flexible endless members to engage said crank elements and constrain said slat members at a predetermined pitch so that said slat members enter a standing agricultural product without severe impact thereon and sweep said product across said cutter bar means into said header mechanism.

2. The apparatus of claim 1 wherein said noncircular path comprises s substantially triangular path.

3. The apparatus of claim 1 and means to raise and lower the reel assembly without altering the angular relationship between said header mechanism and said reel assembly.

4. The apparatus of claim 2 wherein said triangular path is oriented so that said slats enter and engage the agricultural products being harvested and travel downwardly at an acute angle with the ground as said harvesting equipment moves forward through said agricultural products.

5. The apparatus of claim 1 wherein said noncircular path comprises a substantially right triangular path having the hypotenuse thereof positioned at an acute angle to the ground.

6. The apparatus of claim 1 wherein said slats and said crank elements are carried by flexible endless members and a flexible endless guide member comprising chain members traversing substantially congruent paths having corresponding elements thereof parallel.

7. The apparatus of claim 1 and means to adjustably connect said reel assembly to said agricultural harvesting equipment to raise and lower said reel with respect to said equipment.

8. The apparatus of claim 7 wherein said means permits adjustment of the height of said reel above said equipment without altering the angular relationship therebetween.

9. In an agricultural harvesting machine, including a header mechanism having auger means to move the agricultural product into the harvesting apparatus and cutter bar means to sever the stalks of said product, the combination of said harvesting machine with a reel apparatus connected to said header mechanism, said reel apparatus comprising:
   frame means pivotally connected to said header mechanism at each side thereof, said frame means pivotally adjustable to modify the height of said reel with respect to said header;
   a plurality of transversely spaced endless chain belt mechanisms drivingly mounted on said frame means positioned above said cutter bar on a noncircular path substantially perpendicular to said cutter bar;
   rotatable drive means engaging each of said endless chain belt mechanisms;
   a crank chain belt mechanism eccentrically located with respect to said path of said endless chain belt mechanisms and traversing a path substantially congruent to the path of said transversely spaced endless chain belt mechanism having corresponding elements substantially parallel thereto;
   a plurality of reel slats pivotally mounted on said endless chain belt mechanisms, said reel slats engaging crank means attached to said crank chain belt mechanism to maintain said slats in a predetermined pitch; and
   crank chain drive means engaging said rotatable drive means to impart equal linear speeds to said endless chain belt mechanisms and said crank chain belt mechanisms to maintain said slats at a predetermined pitch so that said slat members enter said agricultural product without severe impact thereon and sweep said agricultural product across said cutter bar means to said auger means.

10. The combination as defined in claim 9 wherein each of said chain belt mechanisms traverses a substantially triangular path having one side thereof positioned at an acute angle with the horizontal such that said slats traverse a downward path progressing toward said header.

* * * * *